Figures 1, 2:
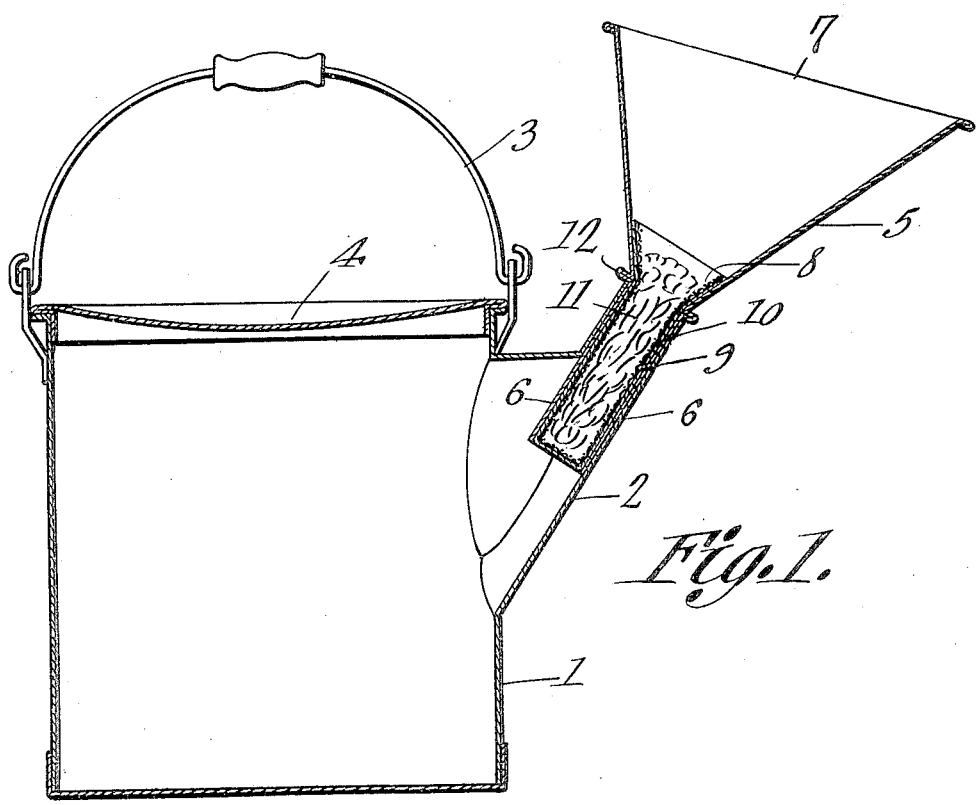

R. F. ALEXANDER.
STRAINING DEVICE FOR FUNNELS.
APPLICATION FILED MAR. 28, 1914.

1,104,603.

Patented July 21, 1914.

R. F. Alexander,
Inventor

Witnesses by C. A. Snow & Co.,
Attorneys

UNITED STATES PATENT OFFICE.

ROBERT FRED ALEXANDER, OF KRAMER, INDIANA.

STRAINING DEVICE FOR FUNNELS.

1,104,603.  Specification of Letters Patent.  Patented July 21, 1914.

Application filed March 28, 1914. Serial No. 827,935.

*To all whom it may concern:*

Be it known that I, ROBERT F. ALEXANDER, a citizen of the United States, residing at Kramer, in the county of Warren and State of Indiana, have invented a new and useful Straining Device for Funnels, of which the following is a specification.

The present invention appertains to a strainer for a milking device.

The present invention comprehends the provision of a device of the nature indicated embodying a unique assemblage of the component parts whereby the structure will be comparatively simple, substantial and inexpensive in construction, whereby the several parts may be readily separated for the purpose of sterilization, cleaning and replacement, and whereby the device will be convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a central vertical section of the improved straining device as assembled with the pail or bucket. Fig. 2 is a perspective view of the combination cap and strainer for the bucket spout.

The bucket or pail 1, which is preferably constructed of heavy rolled tin, is provided with an inclined heavy spout 2 at its forward portion, and with a bail handle 3 pivotally connected to the front and rear walls thereof, so as to swing against the sides. The bucket 1 is provided with a lid or cover 4 which is cancaved, so as to provide a seat, in order that the bucket and its lid will provide a convenient stool for the person when milking. The lid or cover 4 is provided with flanges adapted to seat upon and fit snugly within the rim of the bucket 1, to provide a tight closure, so as to prevent the contamination of the milk. The lid 4 is also preferably constructed of heavy sheet metal, whereby the structure will be sufficiently strong and substantial for the purposes.

A heavy funnel 5, has its spout 6 slipped or telescoped into the spout 2 of the bucket, the plane of the rim 7 of the funnel being disposed obliquely or diagonally relative to the axis of the funnel, whereby the mouth of the funnel may be properly positioned to receive the milk while milking. The cylindrical spout 6 of the funnel 5 fitting within the bucket spout, will support the funnel in an effective manner, and will also permit the funnel to be removed or withdrawn.

Straining means are provided within the funnel 5, and to this end a meshed wire or reticulated strainer 8 of funnel-shape has its flared body fitting within the lower portion of the flared body of the funnel 5 and has its cylindrical spout portion 9 fitting loosely within the imperforate spout 6 of the milk funnel 5. A fabric or cloth sack-like strainer 10 is slipped over the reticulated or screen strainer, and fits snugly within the spout of the milk funnel 5, the fabric strainer or sack 10 being seated snugly between the wire strainer 8, and the spout of the funnel 5, with the mouth portion of the sack 10 expanded and clamped between the body of the wire strainer 8, and the lower portion of the body of the funnel 5.

The wire strainer 8 is preferably filled with loose cotton or similar cleaning material 11, to enhance the proper straining of the milk.

The spout 6 of the funnel 5 is also preferably provided with an annular bead or shoulder 12 adjacent the body of the funnel 5, to seat against the free end of the bucket spout 2, for limiting the inward movement of the spout 6 of the funnel 5 when assembled with the bucket.

A combination cap and strainer 13 is provided for the upper end of the bucket spout 2, which may be slipped over the end of the said spout, when the funnel 5 is withdrawn.

In use, the straining elements 8 and 10 may be readily assembled with the funnel 5 by first slipping the sack or fabric straining element 6 over the wire or foraminous straining element 8, and then slipping the two straining elements downwardly within the spout 6 of the milk funnel 5, whereby the body of the wire straining element 8 in fitting snugly within the lower portion of the body of the funnel 5, will properly position the straining elements and will hold them in place. The wire straining element 8 may be filled, before or after the insertion into the funnel 5, with the cotton or loose straining material 11. Then, when the funnel 15 has been applied to the spout 2 of the bucket, and when the lid 4 of the bucket is applied thereto, the bucket may be employed as a stool, and the funnel 5 will enable the milk to be caught readily and conducted into the bucket 1 through the straining means. The funnel 5 in projecting from the bucket, as illustrated in Fig. 1, will prevent the interference of the present device with the cows, as is occasioned by the use of an ordinary milk pail.

The present device is convenient for milking purposes, the straining means being provided with three distinct straining elements, for effectively arresting the passage of dust, dirt, or other extraneous matter, into the bucket. The straining elements may be readily withdrawn from the funnel 5, to permit them to be sterilized and cleaned by the usual methods employed by dairymen, and the straining elements may be readily replaced when desired, as will be obvious from the foregoing taken in connection with the drawings. In fact, all of the parts of the present device may be readily separated or detached for the purpose of sterilization and cleaning.

After the milking operation, the funnel 5 may be withdrawn from the bucket spout 2, and the combination cap and strainer 13 may be applied over the end of the bucket spout, to prevent the ingress of dust and foreign matter in the bucket, and to serve as a strainer when the milk is poured out through the bucket spout.

The bucket may also be employed for sprinkling purposes, by applying a suitable sprinkling head to the end of the spout 2, whereby the stall floors may be sprinkled prior to milking, so as to settle the dust, or the device when employed as a sprinkler, may be used to advantage in other respects.

The position of the handle 3 is of advantage in connection with the spout 2 and the funnel carried thereby, inasmuch when during the milking operation, the handle 3 may be swung against one side of the bucket, so as to be readily reached, should the cow become unruly, or kick. Thus, the operator may stand up quickly, and grasp the bail with one hand, to draw the bucket out of the way.

When the funnel is removed, and the cap 13 applied to the spout 2, a piece of cheese cloth or other fabric may be placed over the end of the spout 2, under the cap 13, in order to better close the spout, and in order to better strain the milk when the same is poured from the bucket.

When the device is not in use, the funnel may be housed within the bucket, to prevent contamination thereof.

Having thus described the invention, what is claimed as new is:—

In combination, a funnel including a cylindrical imperforate spout and a flared body, a straining screen including a cylindrical spout portion fitting in the funnel spout and a flared body fitting in the funnel body, and a straining sack slipped over the spout portion of the straining screen and fitting snugly in the funnel spout, the mouth portion of the sack being expanded and clamped between the bodies of the funnel and straining screen.

In testimony that I claim the foregoing as my own, I have hereto affixed my signature in the presence of two witnesses.

ROBERT FRED ALEXANDER.

Witnesses:
J. R. NEWLIN,
CHAS. F. SAUER.